United States Patent
Mui (10) Patent No.: US 8,433,261 B2
(45) Date of Patent: Apr. 30, 2013

(54) RF COMMUNICATIONS DEVICE WITH INVERSE FUNCTION FOR COUPLER THEREIN AND RELATED METHODS

(75) Inventor: Andrew Mui, Rochester, NY (US)

(73) Assignee: Harris Corporation, Melbourne, FL (US)

( * ) Notice: Subject to any disclaimer, the term of this patent is extended or adjusted under 35 U.S.C. 154(b) by 145 days.

(21) Appl. No.: 13/170,617

(22) Filed: Jun. 28, 2011

(65) Prior Publication Data
US 2013/0005281 A1   Jan. 3, 2013

(51) Int. Cl.
*H01Q 11/12* (2006.01)
*H04B 1/04* (2006.01)

(52) U.S. Cl.
USPC .... 455/120; 455/63.1; 455/67.13; 455/114.2; 455/125; 375/296; 375/297

(58) Field of Classification Search ................. 455/63.1, 455/67.11, 67.13, 114.2, 114.3, 115.1, 115.3, 455/120, 125, 126, 127.1; 375/296, 297, 375/298
See application file for complete search history.

(56) References Cited

U.S. PATENT DOCUMENTS

| | | | |
|---|---|---|---|
| 3,906,405 A * | 9/1975 | Kommrusch | 333/17.3 |
| 5,164,959 A | 11/1992 | Cai et al. | 375/1 |
| 5,206,600 A | 4/1993 | Moehlmann | 324/650 |
| 5,386,194 A | 1/1995 | Moehlmann | 324/650 |
| 5,867,065 A * | 2/1999 | Leyendecker | 455/126 |
| 6,151,354 A | 11/2000 | Abbey | 375/211 |
| 6,853,246 B2 * | 2/2005 | Bauder et al. | 375/297 |
| 7,023,929 B2 * | 4/2006 | Mujica et al. | 375/296 |
| 7,099,399 B2 * | 8/2006 | McCallister | 375/269 |
| 7,983,327 B2 * | 7/2011 | Brobston | 455/114.3 |
| 2003/0058960 A1 | 3/2003 | Lee | 375/297 |
| 2008/0113628 A1 | 5/2008 | Muhammad et al. | 455/77 |

* cited by examiner

*Primary Examiner* — Quochien B Vuong
(74) *Attorney, Agent, or Firm* — Allen, Dyer, Doppelt, Milbrath & Gilchrist, P.A.

(57) ABSTRACT

A radio frequency (RF) communications device may include a power amplifier, an antenna, a tunable coupler between the power amplifier and the antenna, a processor, and an exciter module coupled between the processor and the power amplifier and generating an RF signal based upon a baseband signal. The processor may be configured to set the tunable coupler to a desired tuning and thereby defining a transfer function for the tunable coupler, and to generate an inverse transfer function of the transfer function of the tunable coupler. The processor may be configured to perform digital filtering upstream of the power amplifier based upon the inverse transfer function.

18 Claims, 8 Drawing Sheets

RF COMMUNICATIONS DEVICE WITH INVERSE FUNCTION FOR COUPLER THEREIN AND RELATED METHODS

FIELD OF THE INVENTION

The present invention relates to the field of wireless communications, and, more particularly, to a communications device with a tunable antenna coupler and related methods.

BACKGROUND OF THE INVENTION

Wireless communications devices are an integral part of society and permeate daily life. The typical wireless communications device includes an antenna, and a transceiver coupled to the antenna. The transceiver and the antenna cooperate to transmit and receive communications signals. A typical radio frequency (RF) transceiver includes a power amplifier for amplifying low amplitude signals for transmission via the antenna.

One example of a wireless communications device is a high frequency (HF) wireless communications device. The typical HF wireless communications device covers the frequency range of 1.5-30 MHz and provides several benefits. For example, the HF wireless communications device offers potential worldwide communication capabilities with little to no infrastructure. Indeed, HF communication is popular with many amateur (HAM) radio operators, permitting one operator to readily contact another operator on another continent. The long range of HF wireless communication systems is to the result of the good propagation characteristics of HF waves reflecting off of and refracting with the Earth's ionosphere. Nevertheless, worldwide HF communication may only be available in the best of ionospheric conditions. Other conditions that may affect HF communications include, for example, sunlight/darkness at site of transmission and reception, season, solar sunspot cycle, solar activity, and polar aurora. Accordingly, the user may manually cycle through several frequencies to find a channel suitable for transmission.

Notwithstanding the above noted benefits of the HF wireless communications device, the typical HF wireless communications device may have a limited bandwidth of 3-5 KHz, for example. Attempts at expanding the typical bandwidth of the HF wireless communications device may suffer from several drawbacks. In particular, several components in the typical HF wireless communications device may be non-linear outside the typical operation bandwidth. For example, the coupler, which couples the antenna to the power amplifier by way of impedance transformation, may introduce distortion into the frequency spectrum of a wideband HF signal.

One approach to HF distortion is disclosed in U.S. Pat. No. 5,164,959 to Cai et al. Cai et al. discloses a HF communications device comprising receiver path with a correlator module for determining transmission channel characteristics. The HF communications device uses the determined transmission channel characteristics to generate a signal for transmission that reduces the transmission channel.

SUMMARY OF THE INVENTION

In view of the foregoing background, it is therefore an object of the present invention to provide a radio frequency (RF) communications device that can readily transmit broadband HF signals with minimal distortion.

This and other objects, features, and advantages in accordance with the present invention are provided by an RF communications device. The RF communications device comprises a power amplifier, an antenna, a tunable coupler between the power amplifier and the antenna, a processor, and an exciter module coupled between the processor and the power amplifier and configured to generate an RF signal based upon a baseband signal. The processor is configured to set the tunable coupler to a desired tuning that may maximize power transfer from the amplifier to the antenna and thereby defines a transfer function for the tunable coupler, generate an inverse transfer function of the transfer function of the tunable coupler, and perform digital filtering upstream of the power amplifier based upon the inverse transfer function. Advantageously, the processor may compensate for distortion introduced into a transmitted signal by the tunable coupler.

More specifically, the processor may be configured to set the tunable coupler by at least selectively matching impedances of the power amplifier and the antenna. Also, the processor may be configured to generate the inverse transfer function based upon feedback data from the selective matching of impedances by the tunable coupler. For example, the tunable coupler may comprise at least one tunable capacitor, and at least one tunable inductor coupled thereto, and the feedback data may comprise tunable capacitor and inductor values of the tunable coupler. Additionally, the processor, the power amplifier, and the tunable coupler may be configured to be operable on a 16-Quadrature Amplitude Modulation (QAM) signal.

Another aspect is directed to a method of operating an RF communications device comprising a power amplifier, an antenna, a tunable coupler between the power amplifier and the antenna, and an exciter module coupled to the power amplifier. The method includes setting the tunable coupler to a desired tuning and thereby defining a transfer function for the tunable coupler, generating an inverse transfer function of the transfer function of the tunable coupler, and performing digital filtering upstream of the power amplifier based upon the inverse transfer function.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
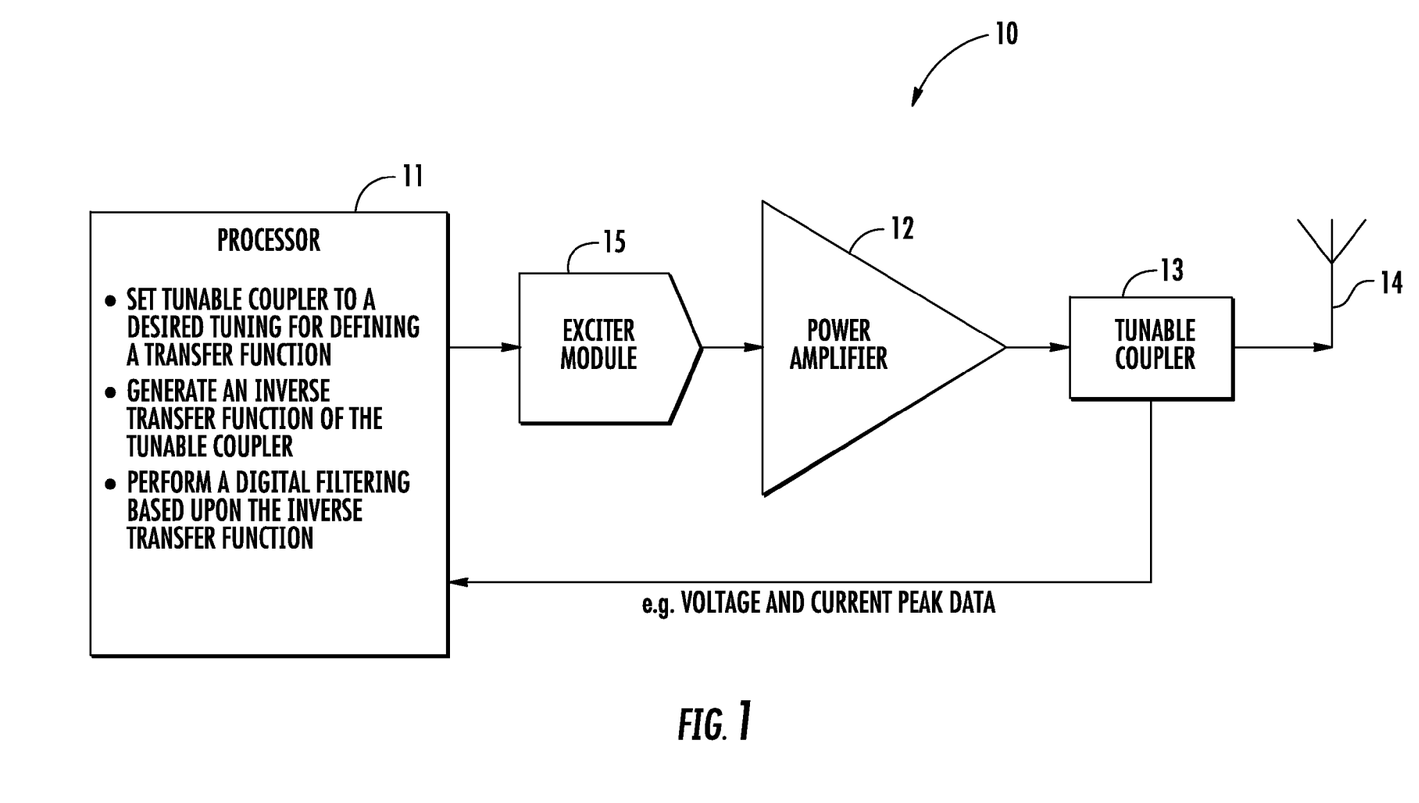
FIG. 1 is a schematic diagram of an RF communications device, according to the present invention.

Referring initially to FIG. 1, an RF communications device 10 according to the present invention is now described. The RF communications device 10 illustratively includes a power amplifier 12, an antenna 14, a tunable coupler 13 between the power amplifier and the antenna, and a processor 11. For example, the processor 11 may comprise one of a digital signal processing (DSP) integrated circuit (IC), a transceiver IC chip, etc. The RF communications device 10 also illustratively includes an exciter module 15 coupled between the processor 11 and the power amplifier 12 and is configured to generate an RF signal based upon a baseband signal, the baseband signal being generated by the processor. As will be appreciated by those skilled in the art, the exciter module 15 may comprise at least one frequency conversion stage and at least one pre-amplification stage.

Additionally, the processor 11, the exciter module 15, the power amplifier 12, and the tunable coupler 13 may be configured to be operable in the high frequency (HF) band, for example. Of course, the RF communications device 10 may operate in other electromagnetic bands, such as very high frequency (VHF), shortwave, etc. The RF communications device 10 may operate on a 16-Quadrature Amplitude Modulation (QAM) signal, for example, but other broadband signal modulation waveforms may be used.

As will be appreciated by those skilled in the art, there may be impedance mismatches between the power amplifier 12 and the antenna 14, which may reduce power efficiency. Accordingly, the processor 11 is illustratively configured to set the tunable coupler 13 to a desired tuning. In particular, the processor 11 tunes the tunable coupler 13 to match the impedances between the power amplifier 12 and the antenna 14 across the frequencies of the transmitted signal. For example, the tunable coupler operates based upon the disclosures of U.S. Pat. Nos. 5,206,600 and 5,386,194 to Moehlmann, each being assigned to the present application's assignee, both of which are hereby incorporated by reference in their entirety.

Nevertheless, the "auto-tuning" of the tunable coupler 13 imparts certain transfer characteristics to the transmitted signal, for example, distortion, i.e. this feature defines a transfer function for the tunable coupler. In particular, this becomes a potential problem in broadband HF applications since newly introduced bandwidth is mostly affected. To this point, the RF communications device 10 is operable at a bandwidth of 100 KHz, for example, rather than the typical 3-5 KHz of the typical HF communications device. An approach to this drawback is provided by configuring the processor 11 to generate an inverse transfer function of the transfer function of the tunable coupler 13, and to perform digital filtering upstream of the power amplifier 12 based upon the inverse transfer function. In other words, the processor 11 generates the inverse transfer function to undo the distortion introduced to the signal by the tunable coupler 13.

Also, the processor 11 is configured to generate the inverse transfer function based upon feedback data from the selective matching of impedances by the tunable coupler 13. For example, the feedback data may comprise tunable capacitor and inductors values of the tunable coupler 13 and other characteristics of the impedance mismatch tuning. In other words, the processor 11 is configured to generate the inverse transfer function based upon the final state of the inductors and capacitors in the tunable coupler 13, which are previously determined by the automatic tuning algorithm. Data used for this automatic tuning algorithm may comprise voltage and current peak data of the tunable coupler 13 and other characteristics of the impedance mismatch tuning.

Figure 2:
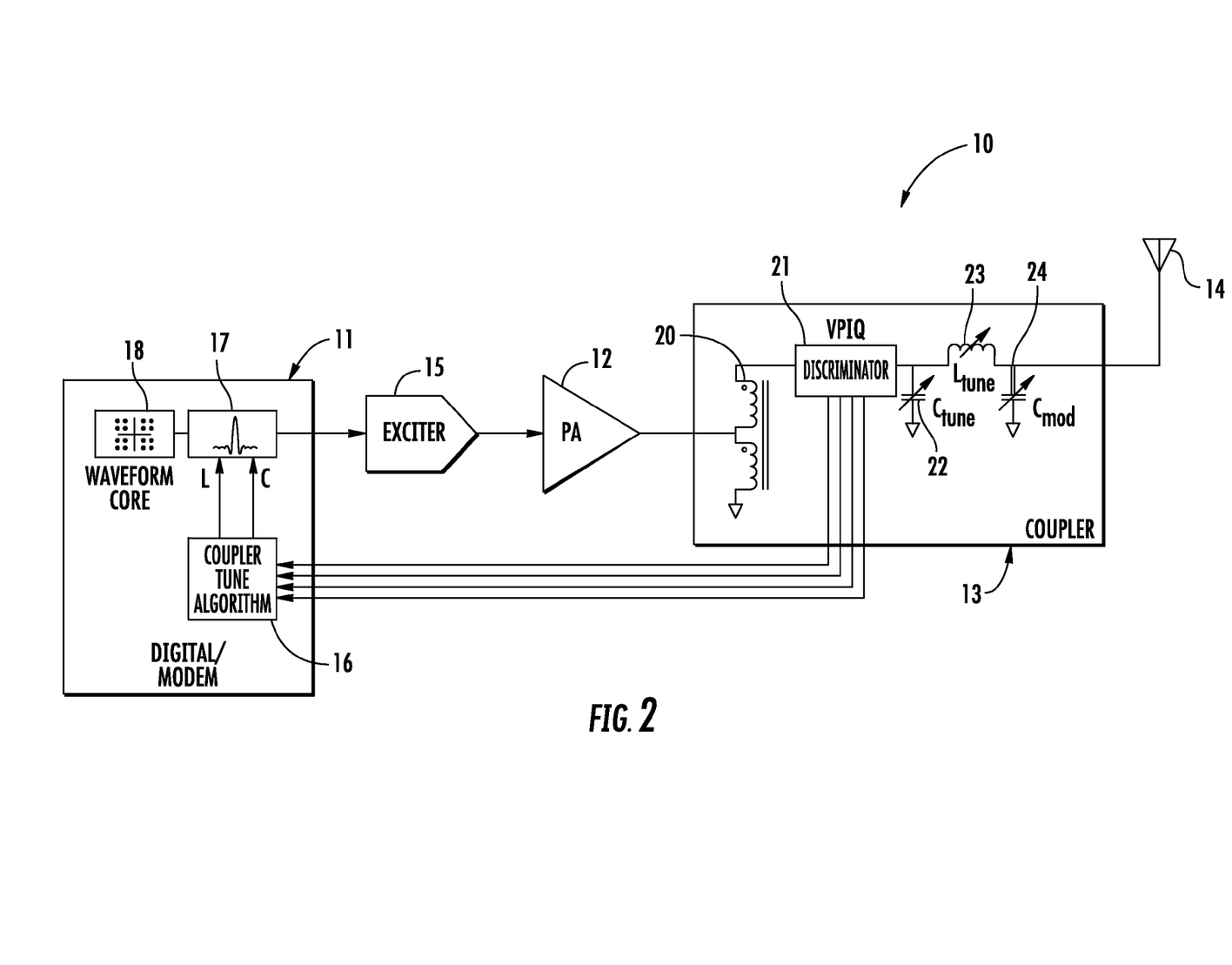
FIG. 2 is a detailed schematic diagram of the RF communications device of FIG. 2.

Referring now additionally to FIG. 2, the tunable coupler 13 illustratively includes a first tunable capacitor 22, a tunable inductor 23 coupled thereto, and a second tunable capacitor 24. The second tunable capacitor 24 is illustratively coupled to the antenna 14. The tunable coupler 13 illustratively includes a discriminator module 21 for deriving the feedback data, and a 4:1 impedance transformer 20 coupled to the discriminator module. Also, this RF communications device 10 illustratively operates on 16-QAM signals.

Yet more, the processor 11 illustratively includes a coupler tune module 16, which is configured to receive the feedback data from the tunable coupler 13, and a waveform core module 18 configured to generate a baseband signal. The processor 11 illustratively includes an inverter module 17 configured to apply the aforementioned filtering to the baseband signal to compensate for the distortion effects of the tunable coupler 13.

Figure 8A:
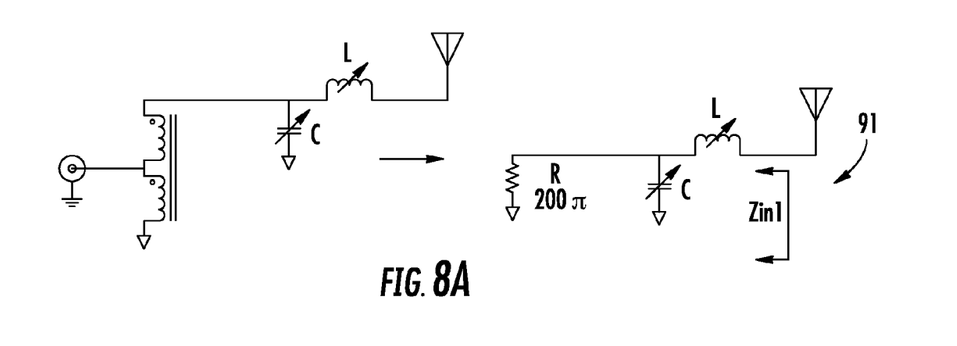
FIGS. 8a-8c are schematic circuit diagrams illustrating generation of the inverse transfer function in the RF communications device of FIG. 2.
Figure 8B:
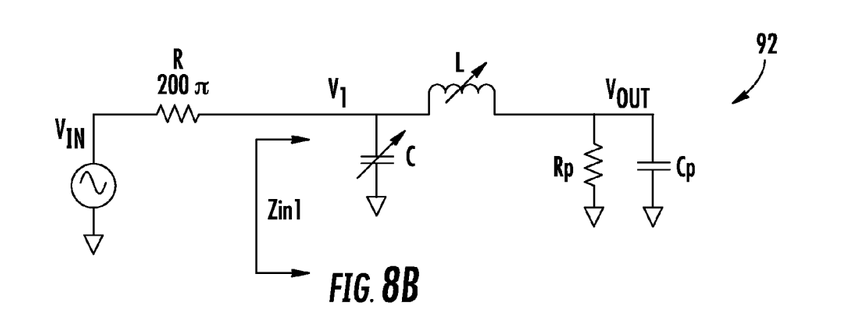
Figure 8C:
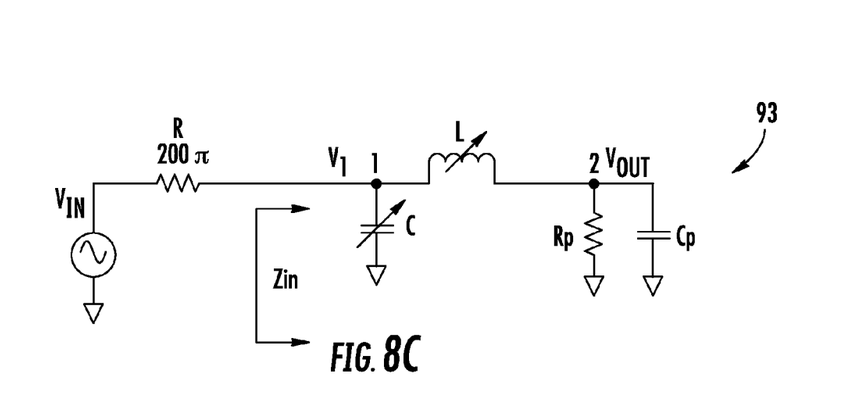

Referring now additionally and briefly to FIGS. 8a-8c, at Diagram 91, the processor 11 generates the inverse transfer function of the transfer function of the tunable coupler 13 by first calculating the load impedance from a known tune state ($Z_{IN1}$).

$$Z_{IN1} = \frac{s^2(RLC) + sL + R}{s(RC) + 1} \quad Z_{ANT} = Z_{IN1}^*$$

At Diagram 92, the input impedance is determined at the input of the tunable coupler 13 as it varies over frequency for the signal, which resolves to:

$$Z_{IN} = \frac{\left(\frac{R_p}{s(R_pC_p)+1} + sL\right)\left(\frac{1}{sC}\right)}{\frac{R_p}{s(R_pC_p)+1} + sL + \frac{1}{sC}} \quad k = \left(\frac{Z_{IN}}{Z_{IN}+R}\right)$$

At Diagram 93, the node equations are then provided at the first and second tunable capacitors 22, 24.

$$\frac{V_{IN} - V_1}{R} = sV_1C + sV_{OUT}C + \frac{V_{OUT}}{R_p}$$

$$\frac{V_1 - V_{OUT}}{sL} = sC_pV_{OUT} + \frac{V_{OUT}}{R_p}$$

The transfer function from the tunable coupler 13 input to the parallel resistance component of the load is provided by the following formula, which is inverted and normalized to unity to provide the aforementioned inverse transfer function.

$$\frac{V_{OUT}}{V_{IN}} = \frac{\left(\frac{1}{R} - \frac{k}{R} - sCk\right)}{\left(sC_p + \frac{1}{R_p}\right)}$$

As will be appreciated by those skilled in the art, several simulations and measurements of operation of the RF communications device 10 are now discussed with reference to FIGS. 3-7. In the measurements, the transmitted signal is modulated using 16-QAM, which is exemplary.

Figure 3:
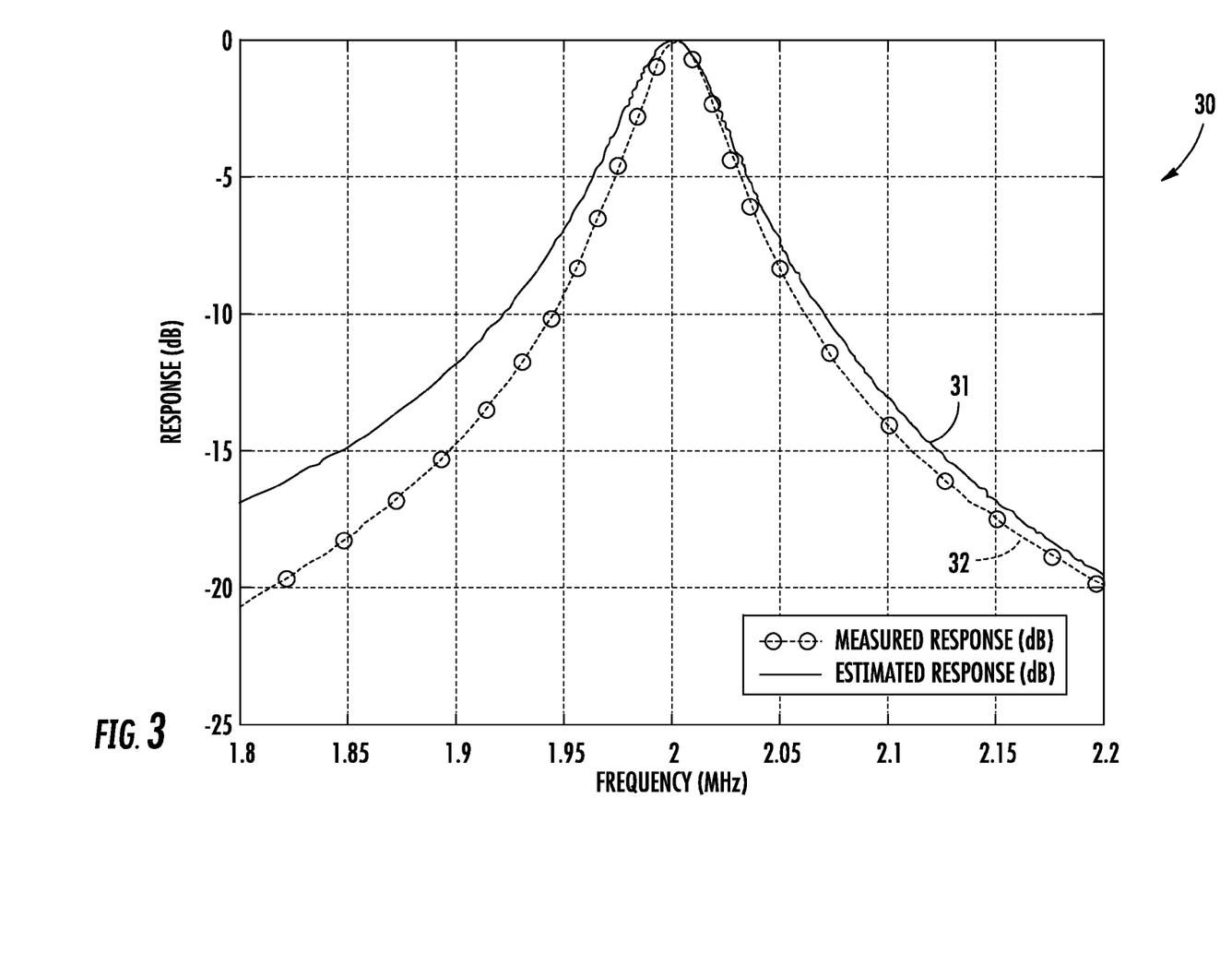
FIG. 3 is a diagram of the transfer characteristics of the tunable coupler of FIG. 2.
Figure 4:
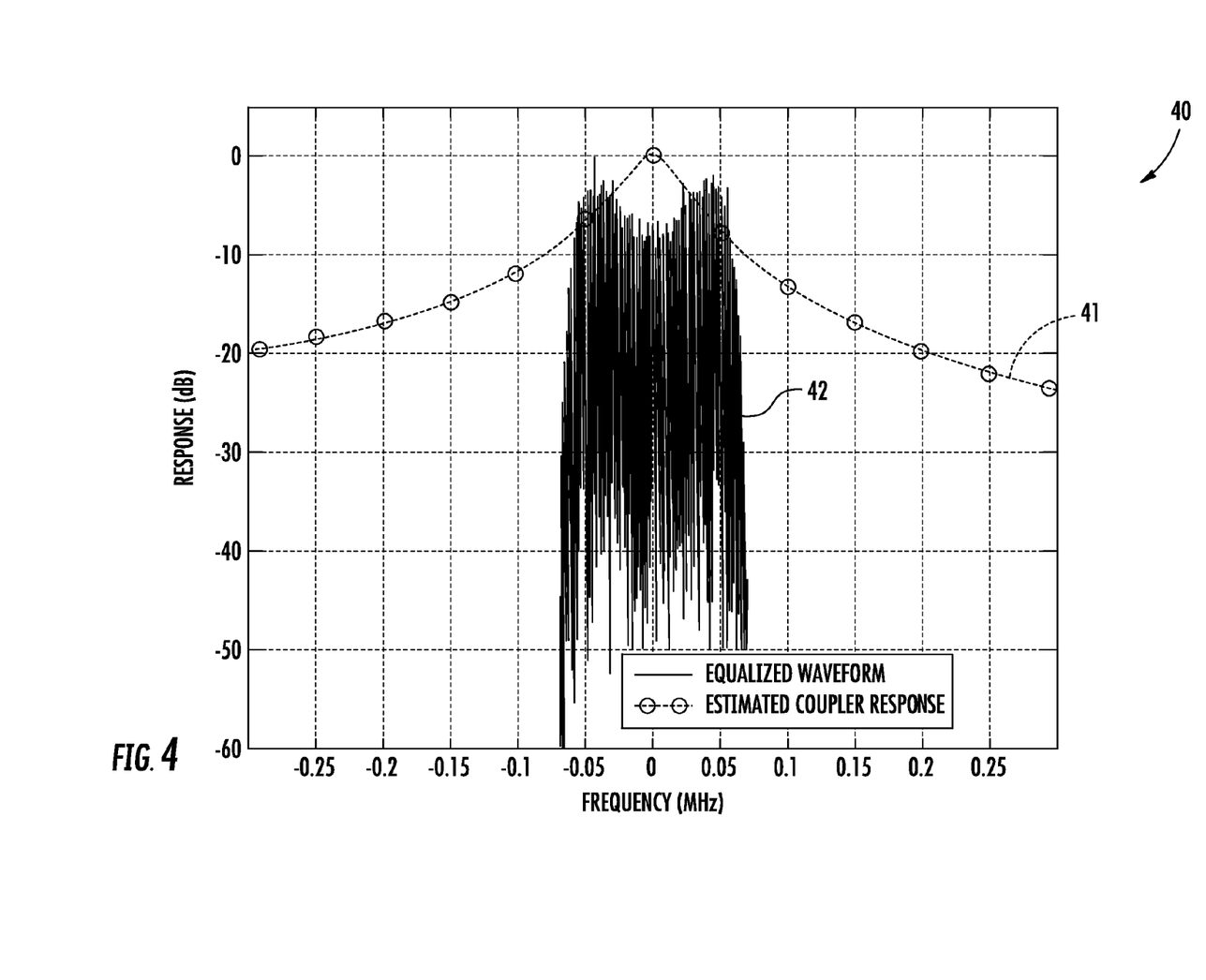
FIG. 4 is a diagram of the transfer characteristics of the tunable coupler and the equalized signal of FIG. 2.
Figure 5A:
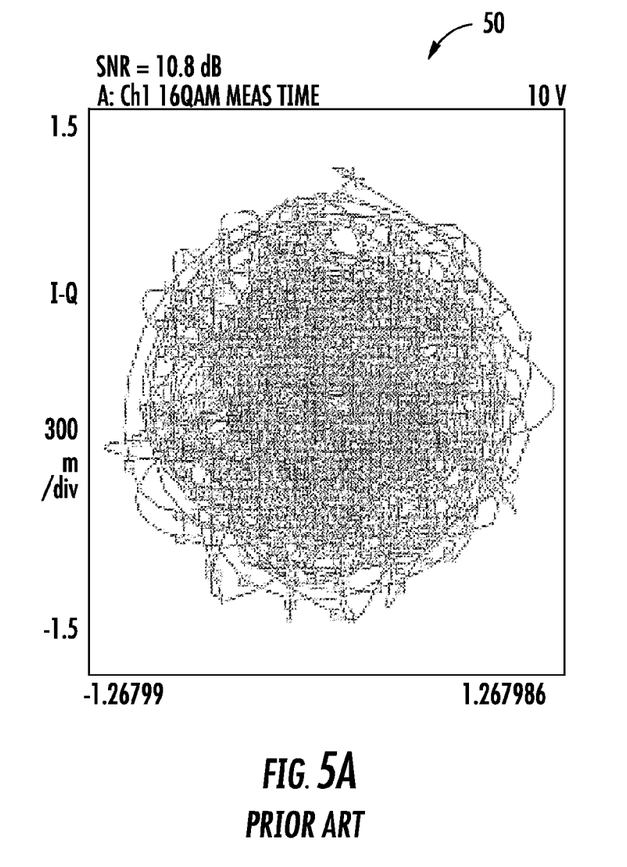
FIGS. 5a and 5b are constellation diagrams of the transmitted signal in the prior art communications device and the RF communications device of FIG. 2, respectively.
Figure 5B:
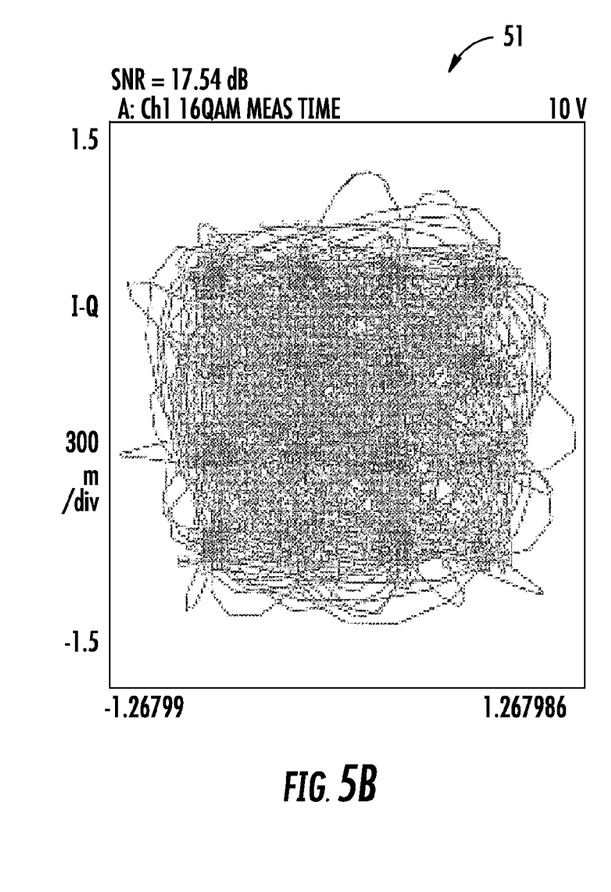
Figure 6A:
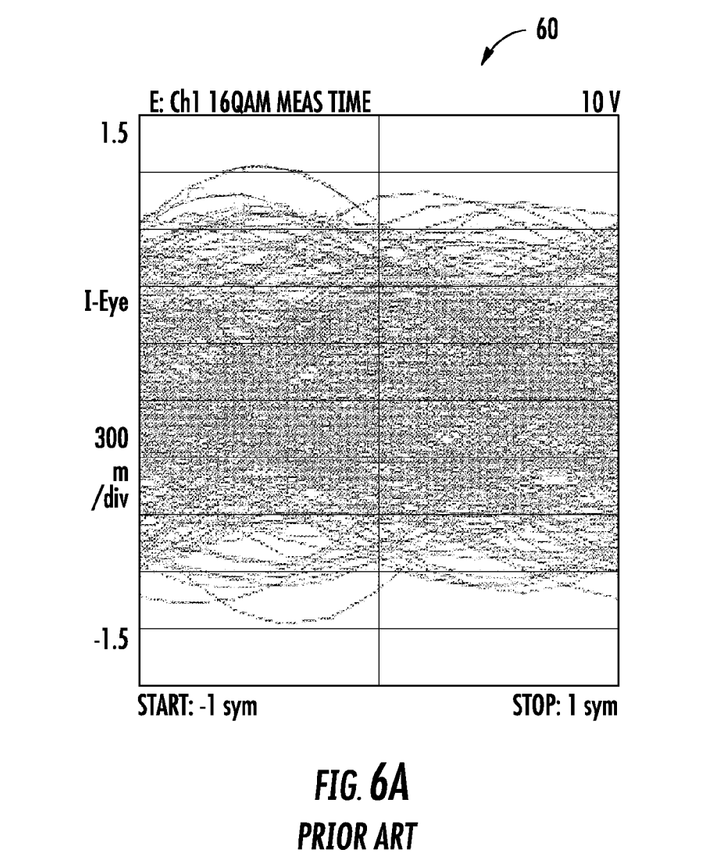
FIGS. 6a and 6b are eye diagrams of the transmitted signal in the prior art communications device and the RF communications device of FIG. 2, respectively.
Figure 6B:
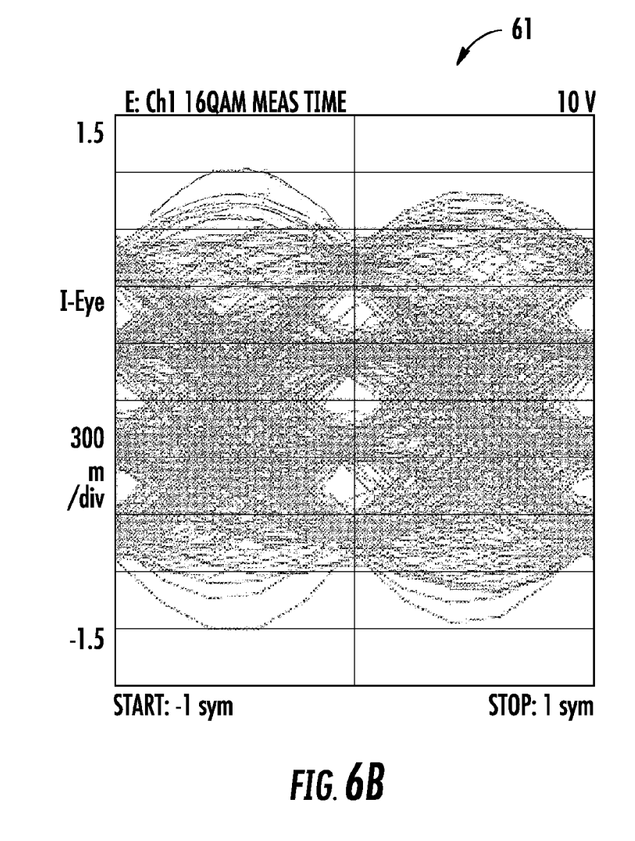

In diagram 30, an actual transfer function curve 32 and a calculated transfer function curve 31 (using the above formula) for an exemplary tunable coupler 13 are shown. In these measurements, the antenna 14 comprises a 3 m whip antenna tuned to 2 MHz using the antenna coupler. At 2 MHz, the input impedance ($Z_{ANT}$) is equal to 10−j1700. Advantageously, the above formula provides a close match to the actual tunable coupler 13 transfer function. Diagram 40 shows another curve 41 of the actual transfer function of the tunable coupler 13 along with the filtered base band signal 42 (equalized waveform).

Diagrams 50 and 51 respectively illustrate constellation diagrams for the transmitted 16-QAM signal in the RF communications device without the effects of the coupler equalizer and in the RF communications device 10. As shown, the distortion introduced by the typical communications device renders the signal unusable whereas the RF communications device 10 increases the SNR of the 16-QAM constellation by approximately 6.7 dB. Diagrams 60 and 61 illustrate eye diagrams for the transmitted signal in a typical communications device and in the RF communications device 10, each again using a 16-QAM modulated signal.

Figure 7:
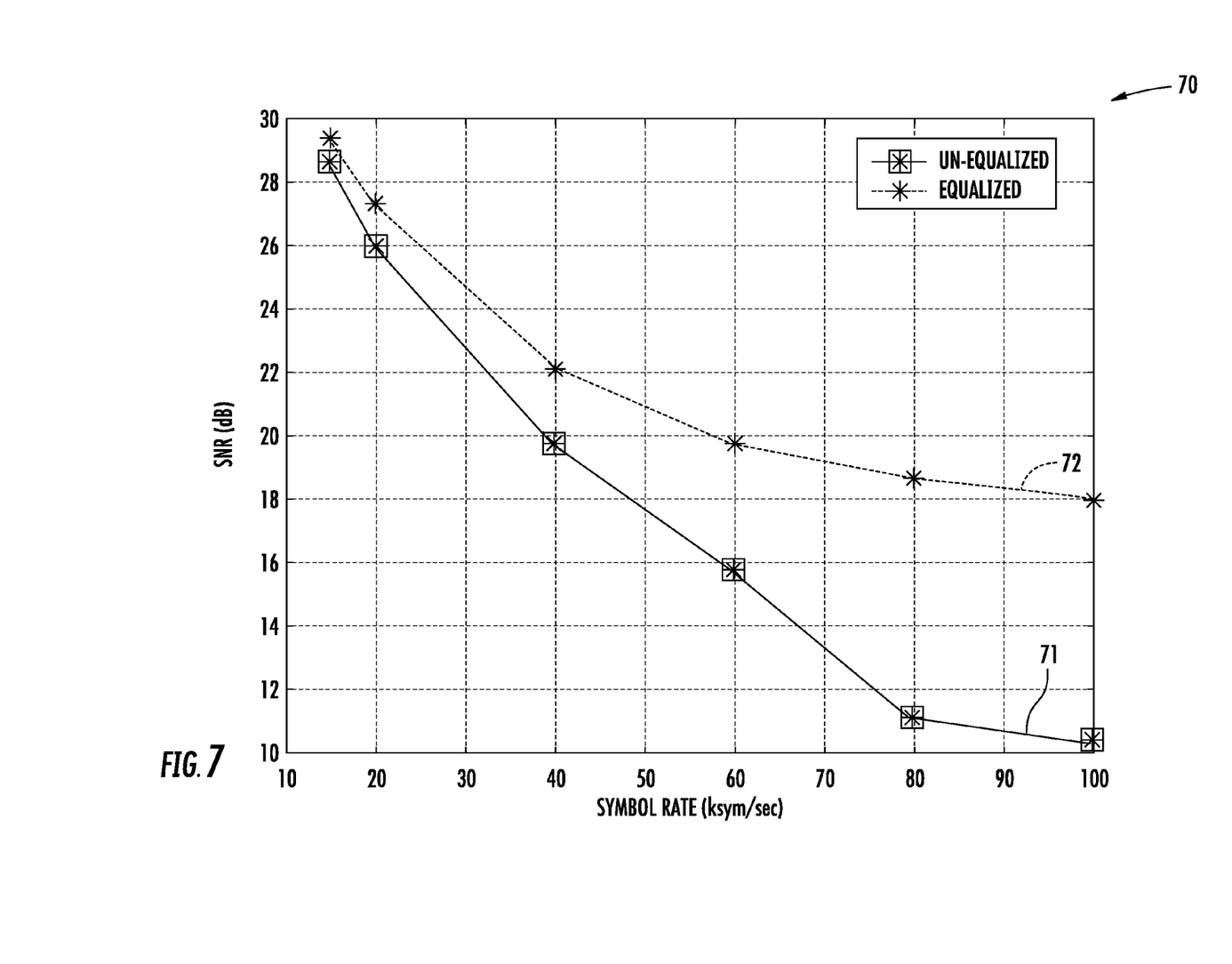
FIG. 7 is a diagram of signal-to-noise ratio for the transmitted signal in the prior art communications device and the RF communications device of FIG. 2.

Lastly, diagram 70 shows SNR measurements for the transmitted signal in a typical communications device 72 operating with a 3 meter whip at 2 MHz and in the RF communications device 10 (72). As is readily shown, the SNR for the transmitted signal 72 in the RF communications device 10 is significantly greater (17.54 dB) at high data rates.

Advantageously, the RF communications device 10 compensates for distortion introduced into a transmitted signal by the tunable coupler 13 using an indirect calculation of the tunable coupler's transfer function. More so, the SNR gain for the transmitted signal is achieved with no additional hardware requirements and minor computations costs levied against the processor 13. Indeed, the present disclosure provides particular advantages over typical adaptive methods, which typically consume significant processing resources and can be undesirable in mobile applications, for example.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A radio frequency (RF) communications device comprising:
   a power amplifier;
   an antenna;
   a tunable coupler between said power amplifier and said antenna;
   a processor; and
   an exciter module coupled between said processor and said power amplifier and configured to generate an RF signal based upon a baseband signal;
   said processor configured to
      set said tunable coupler to a desired tuning and thereby defining a transfer function for said tunable coupler,
      generate an inverse transfer function of the transfer function of said tunable coupler, and
      perform digital filtering upstream of said power amplifier based upon the inverse transfer function.

2. The RF communications device of claim 1 wherein said processor is configured to set said tunable coupler by at least selectively matching impedances of said power amplifier and said antenna.

3. The RF communications device of claim 2 wherein said processor is configured to generate the inverse transfer function based upon feedback data from the selective matching of impedances by said tunable coupler.

4. The RF communications device of claim 3 wherein said tunable coupler comprises at least one tunable capacitor, and at least one tunable inductor coupled thereto.

5. The RF communications device of claim 4 wherein said processor is configured to receive the feedback data comprising tunable capacitor and tunable inductor values of said tunable coupler.

6. The RF communications device of claim 1 wherein said processor, said power amplifier, and said tunable coupler are configured to be operable on a 16-Quadrature Amplitude Modulation (QAM) signal.

7. A radio frequency (RF) communications device comprising:
   a power amplifier;
   an antenna;
   a tunable coupler between said power amplifier and said antenna;
   a processor; and
   an exciter module coupled between said processor and said power amplifier and configured to generate an RF signal based upon a quadrature amplitude modulated (QAM) baseband signal;
   said processor configured to
      set said tunable coupler to a desired tuning by at least selectively matching impedances of said power amplifier and said antenna, thereby defining a transfer function for said tunable coupler,
      generate an inverse transfer function of the transfer function of said tunable coupler, and
      perform digital filtering upstream of said power amplifier based upon the inverse transfer function.

8. The RF communications device of claim 7 wherein said processor is configured to generate the inverse transfer function based upon feedback data from the selective matching of impedances by said tunable coupler.

9. The RF communications device of claim 8 wherein said tunable coupler comprises at least one tunable capacitor, and at least one tunable inductor coupled thereto.

10. The RF communications device of claim 9 wherein said processor is configured to receive the feedback data comprising tunable capacitor and tunable inductor values of said tunable coupler.

11. A radio frequency (RF) transmitter comprising:
    a power amplifier;
    a tunable coupler coupled to said power amplifier and to be coupled to an antenna;
    a processor; and
    an exciter module coupled between said processor and said power amplifier and configured to generate an RF signal based upon a baseband signal;
    said processor configured to
       set said tunable coupler to a desired tuning and thereby defining a transfer function for said tunable coupler,
       generate an inverse transfer function of the transfer function of said tunable coupler, and
       perform digital filtering upstream of said power amplifier based upon the inverse transfer function.

12. The RF transmitter of claim 11 wherein said processor is configured to set said tunable coupler by at least selectively matching impedances of said power amplifier and the antenna.

13. The RF transmitter of claim 12 wherein said processor is configured to generate the inverse transfer function based upon feedback data from the selective matching of impedances by said tunable coupler.

14. The RF transmitter of claim 13 wherein said processor is configured to receive the feedback data comprising tunable capacitor and tunable inductor values of said tunable coupler.

15. A method of operating a radio frequency (RF) communications device comprising a power amplifier, an antenna, a tunable coupler between the power amplifier and the antenna, and an exciter module coupled to the power amplifier, the method comprising:
  setting the tunable coupler to a desired tuning for defining a transfer function for the tunable coupler;
  generating an inverse transfer function of the transfer function of the tunable coupler; and
  performing digital filtering upstream of the power amplifier based upon the inverse transfer function.

16. The method of claim 15 further comprising setting the tunable coupler by at least selectively matching impedances of the power amplifier and the antenna.

17. The method of claim 16 further comprising generating the inverse transfer function based upon feedback data from the selective matching of impedances by the tunable coupler.

18. The method of claim 17 further comprising using a processor to receive the feedback data comprising tunable capacitor and tunable inductor values of the tunable coupler.

* * * * *